2,761,926
DIRECTIONAL SIGNAL SWITCH

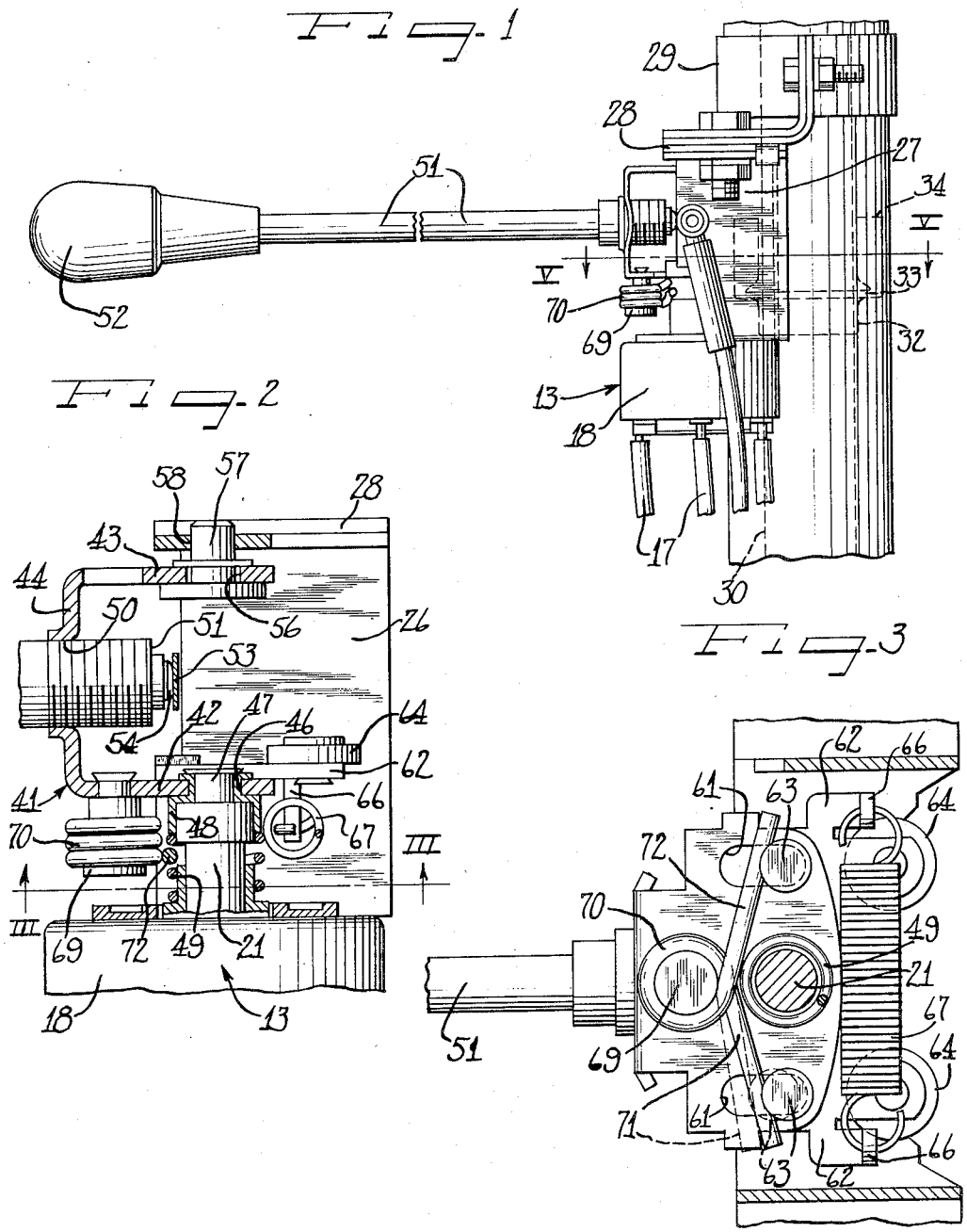

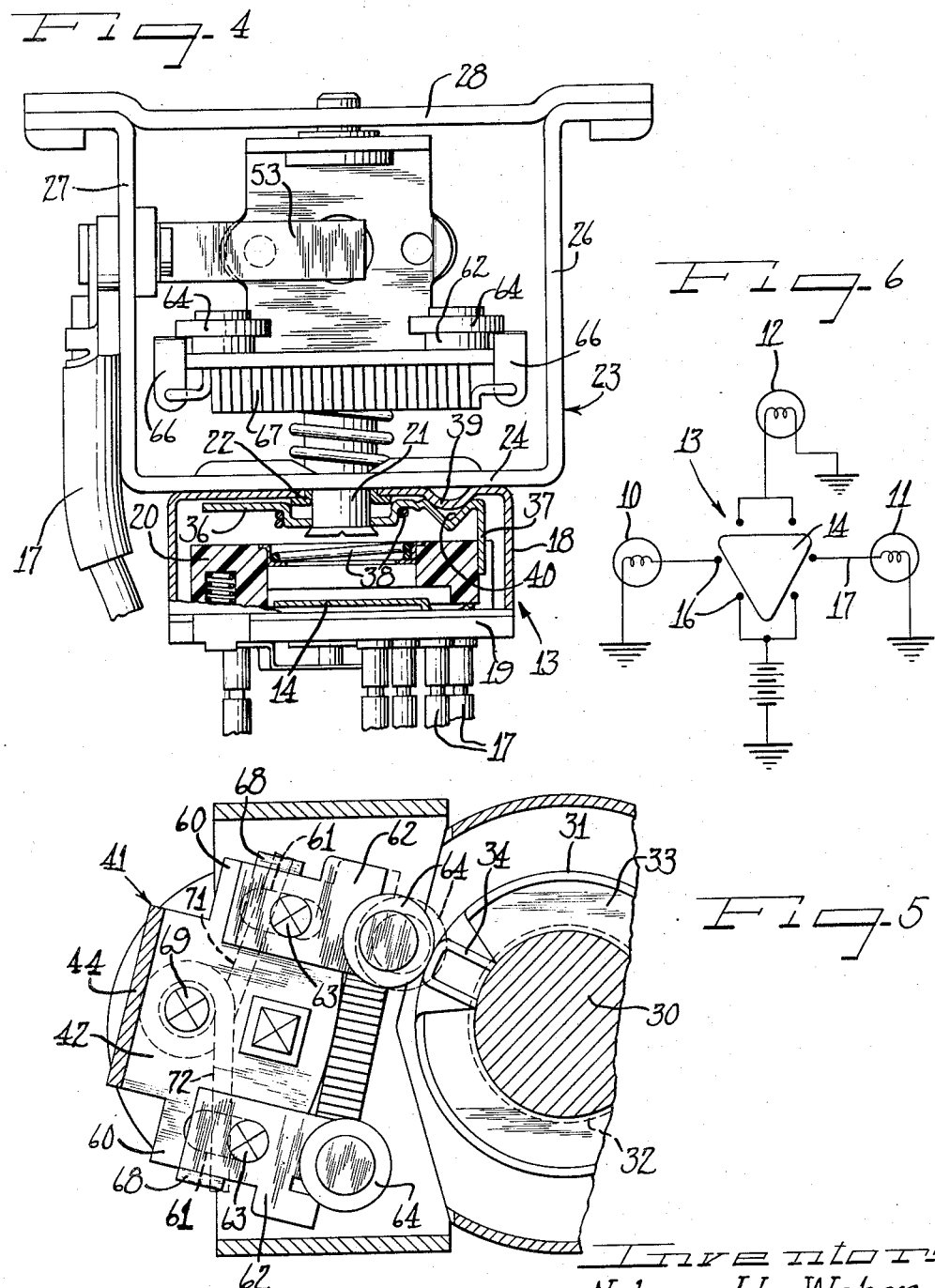
Sept. 4, 1956  N. H. WEBER ET AL  2,761,926
DIRECTIONAL SIGNAL SWITCH
Filed Nov. 18, 1954  2 Sheets-Sheet 2
Inventors
Nelson H. Weber
Paul F. Aitcheson United States Patent Office 2,761,926
Patented Sept. 4, 1956

Nelson H. Weber, Bronson, and Paul F. Aitcheson, Coldwater, Mich., assignors to Kingston Products Corporation, Kokomo, Ind., a corporation of Indiana Application November 18, 1954, Serial No. 469,635

3 Claims. (Cl. 200—61.34)

This invention relates generally to a safety release for a vehicular directional switch assembly of the type having a switching device including actuating elements movable into and out of register with a knock-off device, the directional switch being particularly characterized by the utilization of means mounting the actuating elements for movement outwardly with respect to the knock-off device and including spring means for loading the actuating elements into operative position but yielding to abnormal actuating forces, thereby to preclude possible damage to equipment and injury to the operator.

In recent years, turn-indicating signaling systems have been adopted as standard equipment for most automotive vehicles. As is well known, such systems generally include at least a pair of lights which are exteriorly mounted on the vehicle and which are selectively energized by the manipulation of a control switch by the operator to indicate a desired direction of turn. In such systems, there is usually provided a steering shaft actuated reset mechanism which will restore the electric switch to a neutral position by the return movement of the steering wheel to a neutral position following completion of the indicated turn.

In the operation of directional turn-indicator devices, the operator of the vehicle will sometimes move the actuating lever to a given turn-indicating position sometime in advance of the actual arrival of the vehicle at the turning point, for example, a road intersection. Not too infrequently, under such circumstances, it is necessary to maneuver the vehicle by adjusting the steering course of the vehicle. It is quite possible by so doing, however, that the manipulation of the steering wheel will cause sufficient rotation of the steering post to actuate the knock-off mechanism of the turn-indicating device, thereby prematurely restoring the device to a neutral position and extinguishing the signal lamp associated therewith.

Operators frequently anticipate such inadvertent release of the turn-indicating device by forceably holding the lever in a turn-indicating position even though the steering wheel is being turned in a direction opposite the direction of turn as indicated on the signal system.

The inevitable result of such a series of events is the breaking or damaging of the switch mechanism which is caused through the displacement of the switch knock-off mechanism by a solid cam or striker device affixed to the steering post of the steering wheel assembly.

According to the principles of the present invention, the resetting mechanism includes pivoted cam elements which are spring-biased into operative relation relative to a conventional knock-off device. The supporting means for the pivoted cam elements are slotted, however, and accommodate movement against the spring bias outwardly with respect to the knock-off device if an abnormal actuating force is applied to the resetting mechanism.

It is an object of the present invention, therefore, to provide a safety release arrangement for a directional turn indicator device.

It is another object of the present invention to provide a resetting mechanism for a directional turn switching apparatus which will not be damaged by careless operators.

Another object of the present invention is to provide an improved actuating mechanism for a directional turn indicator switch apparatus comprising a reduced number of simplified elements and which are completely efficient for the intended purpose of the device.

Yet another object of the present invention is to provide a directional signal switch assembly which may be manually retained in a turn-indicating position without incurring the risk of breakage or damage through manipulation of the steering wheel in an opposite direction and without requiring special knock-off devices on the steering post of the vehicle.

Many other features, advantages and additional objects of the present invention will become manifest to those versed in the art upon making reference to the description which follows and the annexed sheets of drawings in which a preferred structural embodiment incorporating the principles of the present invention is shown by way of illustrative example.

On the drawings:

Figure 1 is an elevational view, partly broken, of a directional switch assembly embodying the principles of the present invention;

Figure 2 is a partial cross-sectional view somewhat enlarged looking in the same direction as Figure 1 but illustrating additional details of construction of the actuating mechanism;

Figure 3 is a partial cross-sectional view with parts shown in elevation taken substantially on line III—III of Figure 2;

Figure 4 is a side elevational view, partly in section, of the assembled control switch mechanism shown in Figure 1 and shown in proportions slightly larger than the view of Figure 1;

Figure 5 is a partial cross-sectional view with parts removed taken generally on the line V—V of Figure 1 and illustrating the operation of the structure provided in accordance with the principles of the present invention; and Figure 6 is a schematic circuit diagram of a vehicle turn-indicating signaling system incorporating a control switch embodying this invention.

As shown on the drawings:

Referring first of all to the schematic circuit diagram of Figure 6, the left-hand signal lamp is indicated at 10 and the right-hand signal lamp is indicated at 11, while a pilot light visible to the operator and indicating energization of the signal lamps 10 and 11 is indicated at 12 and will be located at some position readily visible to the operator. The switching device in control of the energization of the lamps 10, 11 and 12 is indicated generally at 13 and includes an angularly adjustable contact plate 14 movable in selected angular directions to bridge pairs of contact members 16 electrically connected to appropriate conductor wires 17.

In the structure of the present invention, the switching device 13 as shown in Figures 1 and 4 is enclosed within a metal housing 18. All of the contact members 16 are carried on a plate 19 which presents a surface closely confronting the angularly adjustable contact plate 14. To effect angular adjustment of the plate 14, an electrically non-conductive carrier member 20 is provided and is rotatably driven by an operating post 21 supported and journaled by a bearing 22 carried in one wall of the metal housing 18.

The housing 18 of the switching device 13 also carries a frame identified generally by the reference numeral 23. The frame 23 includes one leg 24 which overlies the top wall of the switching device 13. A pair of spaced apart parallel legs 26 and 27 extend away from the leg 24 and are bridged at the free ends thereof by a separate leg member indicated at 28. The frame 23 may be connected by means of suitable support straps indicated in Figure 1 at 29. By this means, the directional signal switch of the present invention may be mounted on a steering post assembly in operative relationship to a rotatable steering post of a vehicle indicated in the drawings at 30.

A conventional knock-off device or striker member is shown attached to the steering post 30 and is indicated generally by the reference numeral 31. The general construction of the knock-off device 31 may be noted upon making reference to Figures 1 and 5. The knock-off device 31 comprises generally an annular ring 32 flanged as at 33. A pair of diametrically opposed lugs 34 extend axially with respect to the flange 33 and in the general direction of the length of the steering post 30. Thus, the lugs 34 project radially outwardly of the steering post 30 and are adapted to engage the actuating elements of a resetting mechanism on the directional signal switch assembly.

Before describing in detail the improvements in the resetting mechanism contemplated by the present invention, it should be noted that there is provided within the housing 18 of the switching device 13 between the carrier 20 and the top wall of the housing 18 a detent means which includes a detent plate 36 carried on the post 21 and having fingers 37 engaged with the carrier 20. A continuous biasing means in the form of a coil spring 38 is interposed between the carrier 20 and the detent plate 36 so that the contact plate 14 will be biased into good electrical engagement with the contacts 16 and also to insure operative engagement between detent lugs and recesses 39 and 40 provided between the detent plate 36 and an adjoining wall on the housing 18. Thus, the switch device 13 may be actuated in selected angular direction to indicate either a left-hand turn, or a right-hand turn. Unless reset, the lugs and recesses 39 and 40 of the detent means will retain the switching device 13 in the adjusted position.

Referring now to the structural details of the resetting mechanism, it will be noted that the present invention contemplates the provision of a generally U-shaped actuating member 41 including a pair of spaced apart parallel arms indicated as a first arm 42 and a second arm 43 joined by a bight portion 44.

The first arm 42 is apertured as at 46 to receive the reduced end 47 of the operating post 21 projecting out of the switching device 13. A connecting collar 48 is provided between the operating post 21 and the first arm 42 and abuts against one end of a biasing spring 49 which has its opposite end effectively bottomed against the housing 18 of the switch device 13.

The bight portion 44 has a threaded aperture 50 formed therein to facilitate threaded assembly with the correspondingly threaded end of an actuating lever 51. The actuating lever 51 projects radially outwardly with respect to the steering post 30 into an area readily accessible by an operator for manual manipulation of the switching device 13. The operating lever 51 is preferably made hollow to accommodate conductor means leading to a light bulb constituting the pilot lamp 12 at the free end of the lever arm 51. The light bulb forming the pilot lamp 12 is conveniently enclosed by a translucent cover 52 shaped to a configuration forming a manual grip for the lever arm 51. A spring finger 53 engages an electrical contact 54 at the end of the lever arm 51, thereby to carry electric current to the pilot lamp 12.

The second arm 43 of the actuating member 41 is apertured as at 56 to receive a pivot pin 57. The pin 57 projects upwardly from the second arm 43 into an aperture 58 formed in the cross arm 28. The apertures 56 and 46 are conveniently coaxially disposed to pivotally carry the actuating member 41 on a turning axis extending through the pin 57 and the operating post 21.

As shown in the drawings, the first arm 42 has laterally projecting portions 60 (Figure 5) in which are formed slots 61 extending outwardly with respect to the bight portion 44 in the direction of the steering post 30. A dog or finger 62 is provided on each side of the first arm 42 and includes a pivot pin 63 firmly assembled to each respective dog or finger 62 mounted in a corresponding slot 61. Thus, a finger 62 is provided for each slot 61 and is pivotally carried in the slot, the pivot pin 63 being located at a medial or intermediate portion of the finger 62.

One end of each finger 62 projects outwardly of the first arm 42 towards the steering post 30 and carries a roller 64.

A lug 66 is struck over on the end of each finger 62 and is suitably apertured to receive the end of a coiled spring 67 interconnecting the fingers 62 and continuously biasing the fingers 62 into abutting engagement with a pair of stop lugs 68 offset from the laterally projecting portion 60 of the first arm 42 and adjoining the other ends of the respective fingers 62.

The first arm 42 also carries a pin 69 which projects downwardly with respect to the first arm 42 to support and carry a torsion spring 70 having a pair of oppositely extending laterally projecting arms indicated at 71 and 72, respectively. The ends of the arms 71 and 72 overlie the slots 61 and engage the pivot pins 63, thereby to continuously bias the fingers 62 to the ends of the slots 61 towards an operative relation with respect to the striker device 31 on the steering post 30.

In operation, the directional turn indicator mechanism is adjusted to a turn indicating position by selectively manipulating the operating lever 51 to angularly shift the actuating elements of the switch device 13 whereupon one of the rollers 64 will be moved into register with a lug 34 on the striker device 31.

If the operator manipulates the vehicle in the angular direction corresponding to the signaled direction of turn, the lug 34 of the striker device 31 will merely harmlessly engage the corresponding roller 64 and will move it out of the way against the bias of the spring 67. Upon completion of the turn and reverse rotation of the steering post 30, the lug 34 on the striker device 31 will engage the corresponding roller 64 on the finger 62 whereupon the coaction between the end of the finger 62 and the restraining lug 68 will permit the striker device 31 to move the roller 64, the finger 62 and the entire actuating member 41 back to a neutral position, thus resetting the switch device 13.

If the operator, however, inadvertently or purposely holds the lever arm 51 in a turn-indicating position and then reversely turns the steering post 30 so that an abnormal actuating force is transmitted to the roller 64, the corresponding arm 71 or 72 of the torsion spring 70 will yield to permit outward movement of the dog or finger 62, thereby precluding damage to the direction turn indicator apparatus and possible injury to the operator.

It will be understood, of course, that the torsion spring 70 is selected to exhibit sufficient biasing force so that normal actuating forces transmitted between the knock-off device 31 and the roller 64 will effect the movement of the actuating member 41. The strength of the torsion spring 70, however, is selected to yield to abnormal actuating forces as required in accordance with the principles of the present invention.

It should be understood that we wish to embody within the scope of the patent warranted hereon all such modifications as reasonably and properly come within the scope of our contribution to the art.

We claim as our invention:

1. In a vehicle turn-indicating switch of the type adapted for mounting adjacent the steering shaft of an automotive vehicle and cooperating with actuating means carried thereby, a frame having spaced walls apertured to provide a pair of coaxial bearings, an electric switch, said electric switch having stationary elements thereof secured to said frame and a rotatable operating shaft journaled in one bearing aperture of said frame, a U-shaped actuator having one arm corotatably secured to said operating shaft and the other arm pivotally journaled in said other bearing aperture on said frame, a manual operating handle secured to the bight portion of said actuating member, whereby said switch operating shaft may be selectively rotated in either direction from a neutral position upon the manipulation of said operating handle, steering shaft actuatable reset means comprising a pair of pivotally mounted arms with rollers on the free ends thereof and carried on one arm portion of said actuating member, said arms being yieldably joined by a resilient member, offset integral ears on the actuators to limit the pivotal movement of the reset means, whereby the steering shaft actuating means together with the reset means will automatically return the switch to neutral position upon the completion of a turn, said one arm portion having a slot formed therein for each corresponding arm and in which the arm is pivotally carried, and continuous biasing means urging said arms towards the ends of the slots but being yieldable under the influence of abnormal displacement forces.

2. In a vehicle turn-indicating switch of the type adapted for mounting adjacent the steering shaft of an automotive vehicle and cooperable with actuating means carried thereby, a frame having spaced walls apertured to provide a pair of coaxial bearings, an electric switch, said electric switch having stationary elements thereof secured to said frame and a rotatable operating shaft journaled in one bearing aperture of said frame, a U-shaped actuator having one arm corotatably secured to said operating shaft and the other arm pivotally journaled in said other bearing aperture on said frame, a manual operating handle secured to the bight portion of said actuating member, whereby said switch operating shaft may be selectively rotated in either direction from a neutral position upon the manipulation of said operating handle, steering shaft actuatable reset means comprising a pair of pivotally mounted arms with rollers on the free ends thereof and carried on one arm portion of said actuating member, said arms being yieldably joined by a resilient member, integral ears on the actuators to limit the pivotal movement of the rest means, whereby the steering shaft actuating means together with the reset means will automatically return the switch to neutral position upon the completion of a turn, said one arm portion having a slot formed therein for each corresponding arm and in which the arm is pivotally carried, and a torsion spring on said arm portion of said actuating member having a pair of generally oppositely extending spring fingers each engaging a corresponding arm to bias said arms towards the ends of the slots but yielding under the influence of abnormal displacing forces.

3. A directional signal switch comprising electrical switching means for controlling the circuitry of vehicle signal lights, and an actuating mechanism therefor comprising a U-shaped actuating member having first and second parallel arms joined by a bight portion, an actuating handle connected to said bight portion, a rotatable post projecting out of said switching means effecting a driving connection between said first arm of said U-shaped operating member and said switching means and pivotally supporting said first arm on said switching means, support means pivotally connected to said second arm of said U-shaped operating member coaxial with respect to said rotatable post, said first arm having a pair of spaced apart generally parallel slots formed therein extending in outward direction relative to said bight portion, a camming member pivotally carried in each slot, each camming member comprising a finger pivoted at a medial portion thereof and projecting outwardly of said first arm for movement into and out of register with a knock-off device, spring means comprising a torsion spring carried by said first arm and having oppositely extending arm portions engaged against each corresponding camming member for biasing said camming members to the end of a corresponding slot but yielding under the influence of abnormal displacement forces to permit movement of the fingers in the slots, a second spring means interconnecting one end of said fingers, and stop lugs formed on said first arm and engaging the opposite ends of said fingers to maintain the camming members in operative position, whereby the operating member will be moved by engagement with a knock-off device.

References Cited in the file of this patent

UNITED STATES PATENTS

| | | |
|---|---|---|
| 2,276,413 | Moore | Mar. 17, 1942 |
| 2,597,078 | Drury et al. | May 20, 1952 |
| 2,596,834 | Barcus | May 13, 1952 |
| 2,691,704 | Lincoln et al. | Oct. 12, 1954 |